E. H. ASHCROFT.
Non-Freezing Batteries.
No. 145,143. Patented Dec. 2, 1873.
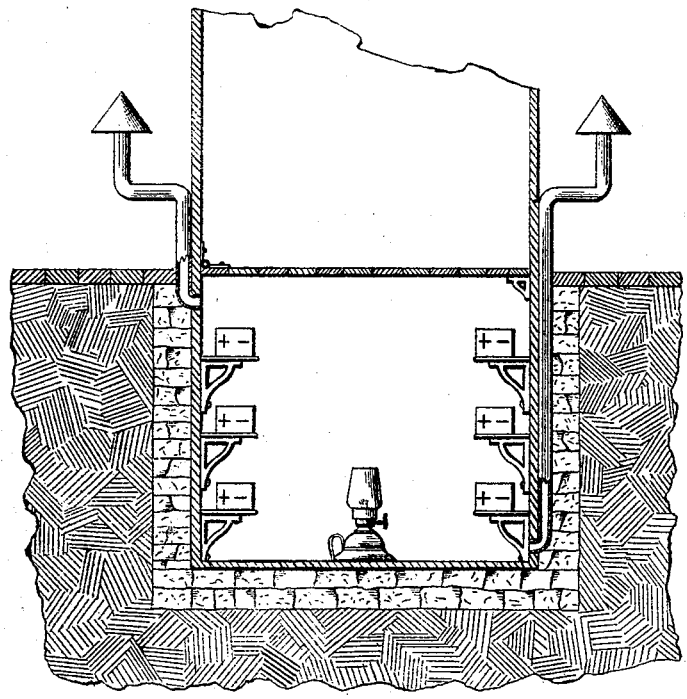
WITNESSES.
INVENTOR
Edward H. Ashcroft
By Leggett & Leggett
Attorneys.

UNITED STATES PATENT OFFICE.

EDWARD H. ASHCROFT, OF BOSTON, MASSACHUSETTS.

IMPROVEMENT IN NON-FREEZING BATTERIES.

Specification forming part of Letters Patent No. 145,143, dated December 2, 1873; application filed October 30, 1873.

*To all whom it may concern:*

Be it known that I, EDWARD H. ASHCROFT, of Boston, in the county of Suffolk and State of Massachusetts, have invented certain new and useful Improvements in Railroad Signal-Boxes; and I do hereby declare the following to be a full, clear, and exact description of the invention, such as will enable others skilled in the art to which it pertains to make and use it, reference being had to the accompanying drawings, which form part of this specification.

My invention relates to non-freezing chambers or cellars for the protection of electrical batteries used in cold places, such as railroad signal-boxes, &c.

In the drawings is represented my improvement, which consists as hereinafter set forth and claimed.

Heretofore great difficulty has been experienced on account of the freezing of the electrical batteries, and I propose to obviate this difficulty as follows: I make a water-tight cellar or caisson, A, and into this caisson I place the box B, containing the cell C of the battery. The caisson A is so deep that it securely houses the battery C. The box B, containing the battery, may exactly fit the caisson, or an air-space may be left between the box and the wall of the caisson; and the battery-box may be at the base of the signal, or it may be separated from it and stand in another locality. In the bottom of the cell-chamber I place a lamp, D, and keep it burning during the winter, and an air-tube, E, furnishes air to the lamp D, while another tube, F, serves as a vent for the foul gases; and the exterior ends of these pipes are covered, so as to prevent rain or snow from passing into them.

Instead of employing a separate box, the caisson itself may be employed, and, whether the caisson or the box be employed, a cover, G, should cover the top of the box or caisson, the said cover inclosing also an air-space, if desirable.

What I claim as new, and desire to secure by Letters Patent, is—

The outdoor battery composed of cells, C, inclosed in a subterranean close chamber, and provided with lamp D, pipe E for supplying fresh air, and vent F for escape of the battery-fumes and products of combustion.

In testimony that I claim the foregoing I have hereunto set my hand this 29th day of October, 1873.

EDWARD H. ASHCROFT.

Witnesses:
ACLAND BOYLE,
LEVERETT L. LEGGETT.